May 30, 1933.  C. BODAN ET AL  1,911,345
AUTOMATIC PHOTOGRAPHING APPARATUS
Filed Aug. 6, 1927   4 Sheets-Sheet 1
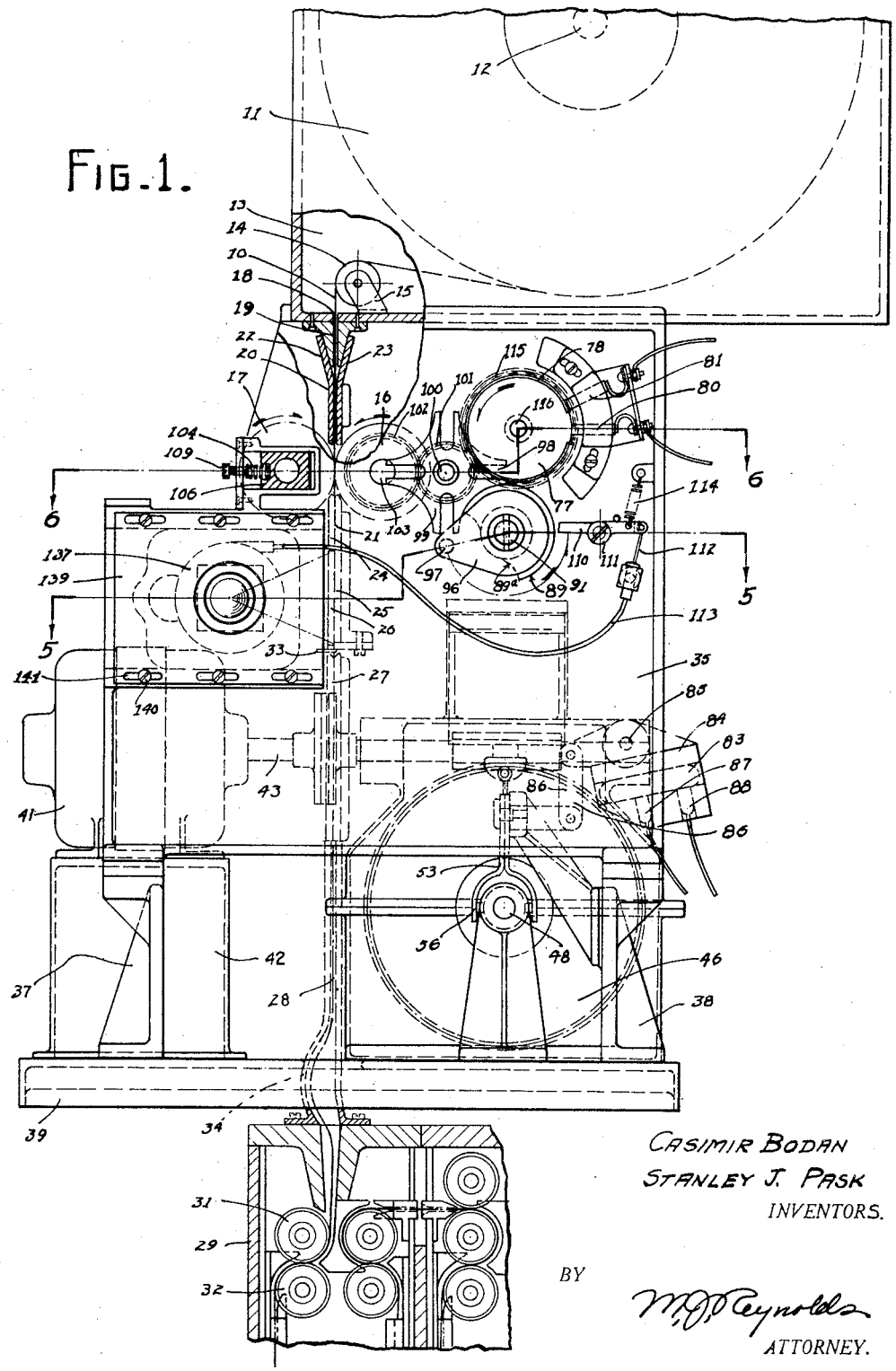
CASIMIR BODAN
STANLEY J. PASK
INVENTORS.
BY
M. P. Reynolds
ATTORNEY.

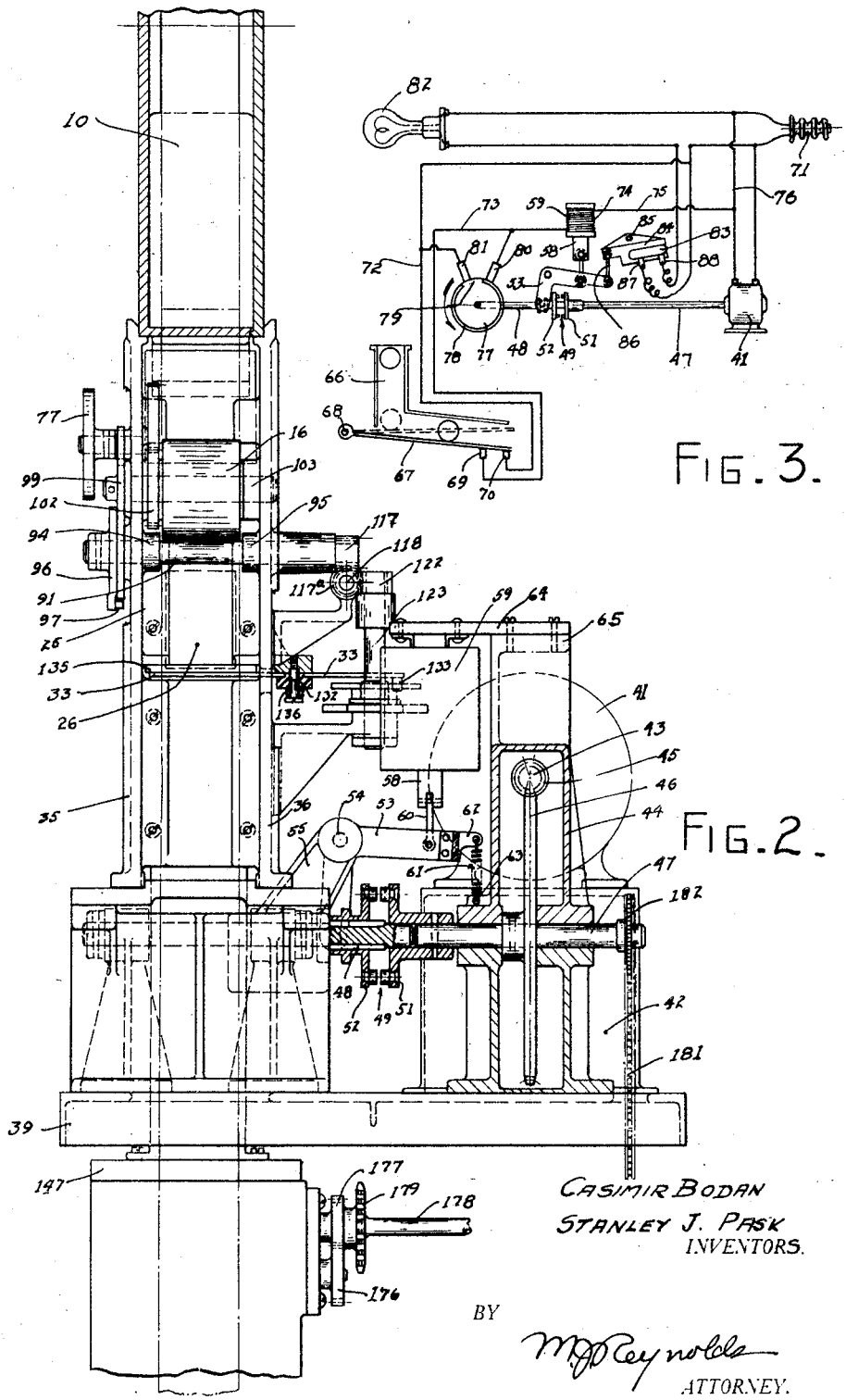

May 30, 1933.   C. BODAN ET AL   1,911,345
AUTOMATIC PHOTOGRAPHING APPARATUS
Filed Aug. 6, 1927   4 Sheets-Sheet 3

CASIMIR BODAN
STANLEY J. PASK
INVENTORS.

BY

ATTORNEY.

May 30, 1933.  C. BODAN ET AL  1,911,345
AUTOMATIC PHOTOGRAPHING APPARATUS
Filed Aug. 6, 1927  4 Sheets-Sheet 4

CASIMIR BODAN.
STANLEY J. PASK.
INVENTORS.

BY

ATTORNEY.

Patented May 30, 1933

1,911,345

UNITED STATES PATENT OFFICE

CASIMIR BODAN, OF JACKSON HEIGHTS, AND STANLEY J. PASK, OF LONG ISLAND CITY, NEW YORK

AUTOMATIC PHOTOGRAPHING APPARATUS

Application filed August 6, 1927. Serial No. 211,031.

This invention relates to automatic photographic apparatus and more particularly to photographic apparatus adapted when set in operation to take automatically a series of photographs in rapid succession on a single strip of sensitized material, and to perform all the necessary operations to develop the strip of pictures and deliver the same from the apparatus in a finished condition in an entirely automatic manner and without requiring the assistance of an operator or of the person being photographed.

The invention is especially concerned with a coin controlled photographic apparatus but it is to be understood that other means of initiating the operation of the apparatus may be utilized.

Among the objects of our invention is to provide an apparatus of the above character which is simple in construction, reliable and economical in operation, and which may be manufactured at relatively small expense.

A further object is to provide an automatic photographic apparatus in which positive photographs in obverse position, that is, in correct right and left arrangement of the object may be produced directly upon the sensitized medium without the use of negatives.

Another object is to provide an apparatus in which the sequential operations of the component parts of the apparatus are positively timed and actuated.

Other objects and advantages will hereinafter appear.

In accordance with our invention we provide a light-proof cabinet or casing in which is housed apparatus adapted to be set into operation by insertion of a coin to energize a light source for illuminating the object being photographed and to feed automatically a strip of sensitized material from a suitable magazine intermittently into position to have an image of the object being photographed projected thereon by an optical system. During the period in which the sensitized strip is at rest, shutter operating means is actuated to open and close the shutter and make the exposure. After a predetermined number of successive exposures have been made, a cutter is automatically operated to sever the exposed strip from the unexposed portion thereof and to permit the strip to be fed to suitable developing and finishing apparatus.

The optical system comprises one or more lenses and a correcting prism for producing an obverse or correct right and left image of the object and the sensitized material is of such nature that a positive photograph, that is, one in which the dark portions of the object are shown as dark on the photograph and the light portions are reproduced as light portions, is produced.

The sensitized strip, after being severed, is fed through the developing and treating tanks.

The component parts of our apparatus are operated from an electric motor through appropriate driving mechanism. The motor is preferably operated continuously and is directly connected through driving mechanism to the feed rolls of the developing and treating tanks so that these rolls are in continuous operation. The remainder of the apparatus is joined to the motor shaft or to a shaft geared thereto through a clutch adapted to be moved into engagement upon insertion of a coin into the apparatus and to be maintined in driving engagement only for a sufficient period of time to enable a predetermined number of exposures to be made.

The operation of the photographing and severing apparatus is entirely distinct from that of the developing and finishing apparatus so that after a set of exposures has been made it is not necessary to wait until the developing and finishing has been completed and the pictures delivered before the next set of exposures may be made but on the contrary, immediately upon the completion of one set of exposures, the next set may be commenced.

In order that the invention may be more fully understood reference will be had to the accompanying drawings in which, Fig. 1 is a front elevation, partly in section, of an apparatus embodying our invention;

Fig. 2 is an end view, partly in section, of the apparatus as viewed from the right of Fig. 1;

Fig. 3 is a diagrammatic representation of the electrical system showing the parts which are directly set into operation by the deposition of a coin in the apparatus;

Figure 4:
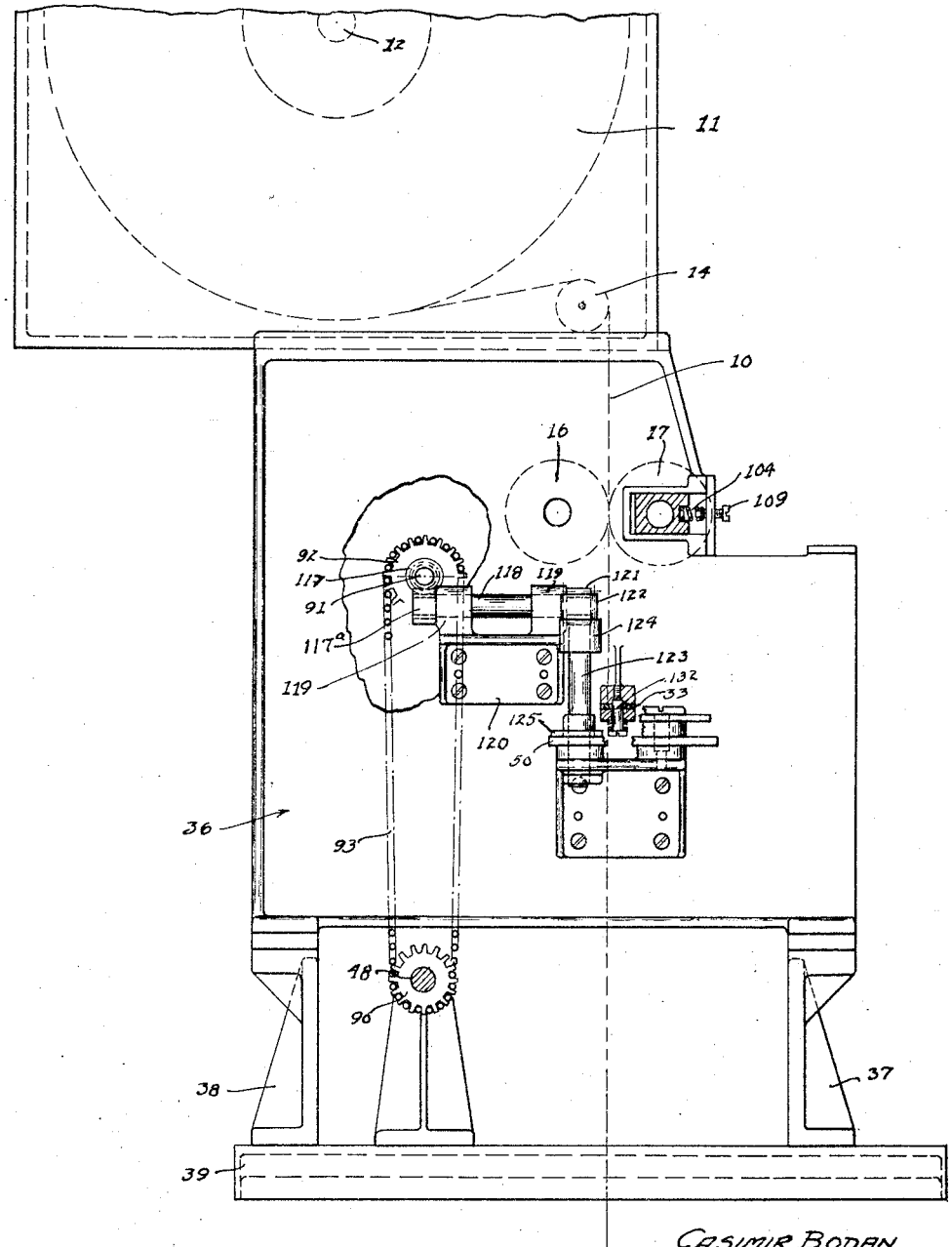
Fig. 4 is a rear elevation, partly cut away, of the photographing and severing portion of the apparatus.

Referring particularly to Fig. 1, a strip 10 of sensitized paper, contained upon a reel 11, having a shaft 12 journaled within a tight enclosure 13, is drawn over a roller 14 mounted upon a bracket 15 contained within the enclosure or casing 13, by a pair of feed rolls 16 and 17. The sensitized strip passes through guideways 19 and 20 above the feed rolls 16, 17 and thence through a guideway 21 disposed immediately below the feed rolls. The guideways 20 and 21 are formed by two parallel plates 22, 23 and 24, 25 respectively, having recesses cut in their adjacent faces as is more clearly shown in Fig. 5. The plate 24 is cut away for a portion of its length to form an opening 26, to expose a section of the sensitized paper and to permit an image to be projected thereon, through the lens and prism system which is disposed to the left thereof in Fig. 1 and fully described hereinafter.

The feed rolls 16 and 17 are intermittently driven so as to momentarily bring an unexposed section of the sensitized paper to rest adjacent the opening 26 during which interval the shutter of the lens system is opened and closed to make the exposure.

The paper passes from the guideway 21 into a fourth guideway 27 and thence through still another guideway 28 in communication with the developing tank 29. The tank 29 contains a pair of feed rolls 31 and 32 adapted to engage the advancing edge of the strip and to feed it into the developing tank. A cutter or blade 33 disposed between the guideways 21 and 27 is actuated, after a predetermined set of exposures, to sever the sensitized strip. The distance between the cutter 33 and feed rolls 31, 32 is such, however, that the strip becomes engaged by the feed rolls before it is severed from the unexposed portion of the strip. The feed rolls 31, 32 and the succeeding rolls are operated at a slower peripheral speed than the rate of travel of the strip through the photographing portion of the apparatus and in order to take care of the slack thereby produced in the strip, the guideway 28 is provided with a bulging portion forming a chamber 34 into which the excess paper may buckle. The severed strip is fed through the developing and treating tanks and delivered from the apparatus in a finished condition as will appear more fully hereinafter.

The guideways 20, 21, 27 and 28, feed rolls apparatus may be employed for bringing the motor into operation by the insertion of the coin in the apparatus, and causing the motor to continue to operate until the completed picture is delivered from the apparatus.

In the embodiment illustrated, all of the mechanisms, excepting the developing and finishing feed rolls, are driven from a shaft 48 in alignment with the shaft 47 and adapted to be operatively connected thereto by a clutch 49. The clutch comprises a driving member 51 keyed to the shaft 47 and a driven member 52 slidingly keyed to the shaft 48. The clutch 49 is operated by a bell crank lever 53 pivoted at 54 in a bracket 55 and having a bifurcated arm 56 engaging in a hub collar 57 on the driven member 52 of the clutch. The bell crank lever is actuated by the core 58 of a solenoid 59 through a link 60. Upon de-energization of the solenoid, the bell crank arm is returned to its normal position by a spring 61 secured to the outer end 62 of one arm thereof and to the gear casing at 63. The solenoid 59 is carried from a plate 64 supported by a bracket 65 extending upwardly from the gear housing 44.

Engagement of the clutch 49 is effected by the deposition of a coin in the apparatus as best illustrated in Fig. 3. A slot 66 is provided in which a coin of the desired denomination may be inserted. The lower wall 67 of the slot is pivoted at 68 and is accurately balanced so that the weight of the coin is just sufficient to lower the same against the electrical contacts 69 and 70. Of course, any desired means of preventing operation by spurious coins may be utilized. Upon closing of the contacts 69, 70 current from the terminal 71 is caused to flow through the conductors 72 across the contacts 69, 70, conductor 73 through the winding 74 of the solenoid 59 and through conductors 75 and 76 to the terminal 71. The solenoid, upon being energized, moves the bell crank lever 53 counter clockwise about its pivot, effecting engagement of the clutch and setting the shaft 48 into rotation. Suitably geared to the shaft, in a manner fully described hereinafter, is a timing disk 77 having a current conducting contact ring 78 on its periphery, except for a limited distance 79. Upon engagement of the clutch 49, the disk 77 rotates so that the conductive ring 78 bridges the brush contacts 80 and 81, thus short-circuiting the contacts 69, 70 and continuing the energization of the solenoid after the coin has passed beyond the end of the wall 67 of the coin slot. The period of rotation of the disk 77 is timed so as to enable one complete set of exposures to be made and the strip severed, at the completion of one revolution, at which time the brush 81 passes from the contact ring 78 and interrupts the circuit to the solenoid. The spring 61

(Fig. 2) then causes the clutch to become disengaged and the operation of the photographic apparatus to cease.

A source of light 82 for illuminating the object to be photographed is also energized through a mercury switch 83 (Fig. 1) by the initial movement of the bell crank lever 53 in response to the pull of the solenoid 59. The switch 83 is mounted on a carrier 84 pivoted at 85 and is adapted to be rocked to a horizontal position by a link 86 joined to the bell crank lever 53, to thereby cause the mercury to bridge the terminals 87 and 88 and complete the circuit to the light source 82. The mercury switch 83 interrupts the circuit to the lamp upon de-energization of the solenoid and consequent movement of the bell crank to its normal position.

Figure 6:
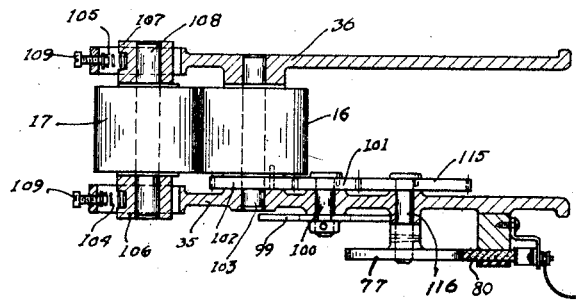
Fig. 6 is a section on the line 6—6 of Fig. 1.

Reference is made to Figs. 1, 2, 4 and 5 for a description of the mechanism for operating in proper sequence, the strip feeding, shutter operating and strip severing mechanism. The driving shaft 48 has a sprocket wheel 90 fixedly mounted thereon for driving a shaft 91 through a second sprocket wheel 92 and chain 93. The shaft 91 is journaled in bearings 94 and 95 in the side plates 35 and 36 and projects outwardly therefrom. On the forward end of the shaft 91 is mounted a wheel 96 having a stud 97 adapted on rotation of the wheel 96 to engage in the slots 98 of the Geneva wheel 99 mounted upon a shaft 100 bearing in the side plate 35. The shaft 100 (Fig. 6) extends through a side plate 35 and on the inner end is provided with a gear 101 in mesh with a gear 102 mounted on the shaft 103 of the feed roller 16. The feed roller 17 is held in frictional engagement with the roll 16 by springs 104 and 105 bearing against the journals 106 and 107 of the shaft 108 thereof. The tension on the springs 104 and 105 may be adjusted by screws 109. It will be noted, from Fig. 1, that upon each revolution of the wheel 96, the Geneva wheel 99 makes one-quarter revolution and through the gears 101 and 102 drives the feed rolls a predetermined distance, sufficient to feed an unexposed portion of the sensitized strip into position to be exposed.

The Geneva wheel 99 is made concave between the slots 98 and such concave portions are adapted to be engaged by the surface 89 of the drive wheel 96 during the period the stud 97 is out of engagement with one of the slots 98, to lock the Geneva wheel against rotation. When the stud 97 moves into engagement with the slot 98, a cut away portion 89ª of the surface 89 has moved into position to unlock the Geneva wheel and permit it to be rotated.

During the interval between the time the stud 97 leaves one of the slots 98 of the Geneva wheel until it moves in a counter clockwise direction into engagement with the next slot, the sensitized strip is at rest and during this interval the stud 97 is brought into engagement with a lever 110 pivoted at 111 to trip the same and actuate a Bowden wire 112 connected thereto operating in a flexible cable 113 to actuate the shutter mechanism to make the exposure. The lever 110 is returned to its normal position by a spring 114.

A gear wheel 115 also meshes with the gear wheel 101 and is driven thereby. Gear wheel 115 is mounted on a shaft 116 which carries on its opposite end the timing disk 77 (Fig. 1). The contact ring 78 of the timing gear is adapted to engage the brush contacts 80 and 81 to maintain the solenoid energized. The gears are so designed in the embodiment shown that the timing disk makes one complete revolution while the Geneva wheel 99 makes two complete revolutions or while a set of eight, or any other desired number of exposures are being made, depending on the number of slots in the Geneva wheel.

Figure 5:
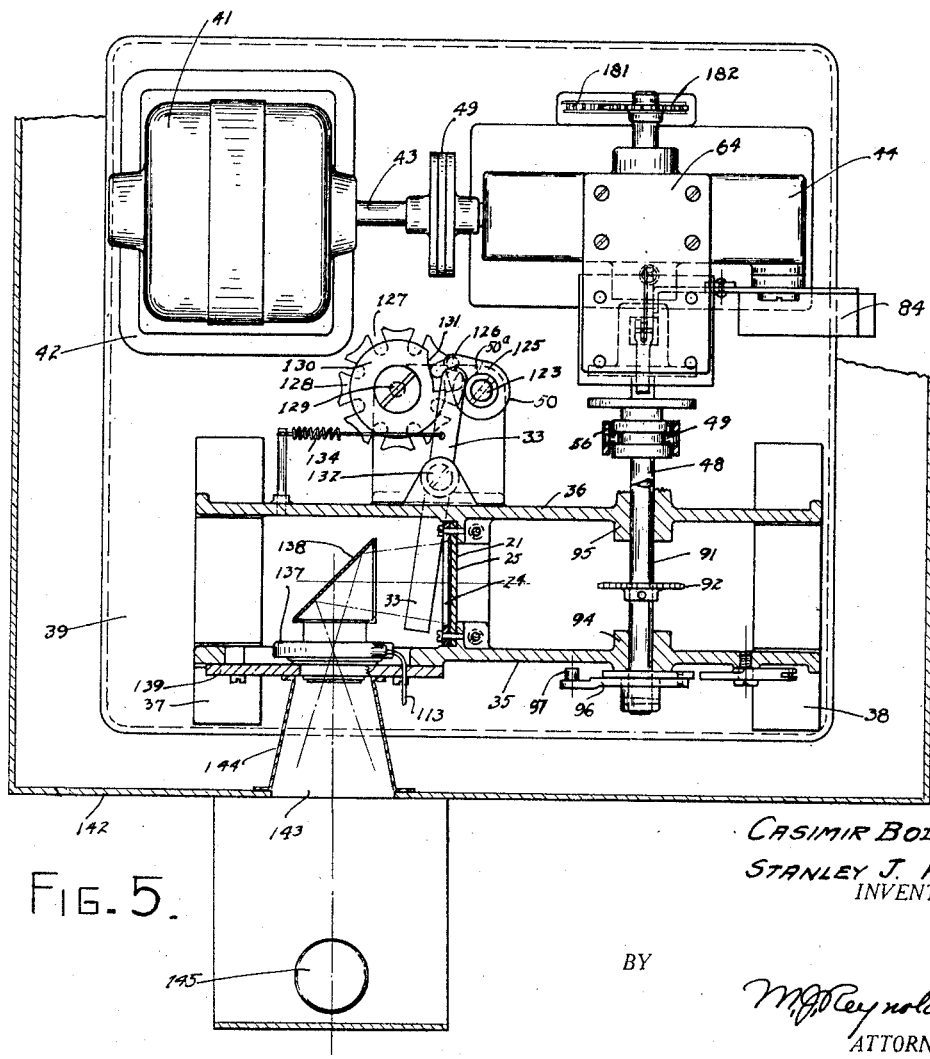
Fig. 5 is a section on the line 5—5 of Fig. 1.

The shaft 91 has on its inner end a spiral gear 117 meshing with a spiral gear 117ª mounted on a shaft 118 rotating in bearing 19 on a bracket 120 carried by side plate 36. A spiral gear 121 mounted on the opposite end of the shaft 118 engages with another spiral gear 122 carried by the vertical shaft 123 provided with a bearing 124 and having on its lower end a wheel 125 (Fig. 5). The wheel 125 has a stud 126 thereon adapted to engage in the slots 127 of the Geneva wheel 128 mounted on a shaft 129. The Geneva wheel 128 is provided with eight slots, in the embodiment shown, so that it makes but one complete revolution to each eight revolutions of the driving wheel 125.

Mounted on the shaft 129 is a cam 130 having a cylindrical surface provided with a recessed portion 131. The strip severing blade 33 pivoted at 132 has a roller 133 on its rear end which is caused to bear on the cam surface 130 by means of a spring 134. Upon the completion of each complete revolution of the cam, the roller 133 engages in the recess 131 and the knife or cutter blade 33 is moved by spring 134 to sever the strip of exposed paper. In order to insure a clean cut the blade 33 is urged against the stationary cutter plate 135 by spring 136 coiled about the pivot 132.

The timing of the mechanism is such that the cutter blade is operated while the strip is stationary and after the last exposed portion of the strip of pictures has been fed past the cutter.

The optical system for making the exposure comprises a lens and shutter housing 137 containing one or more lenses and a correcting prism 138 for producing an obverse or proper right and left arrangement of the image. This unit of lens and prism is mounted on a plate 139 secured to the side plate 35 by screws 140 and rendered adjustable thereon by slots 141.

A light-proof cabinet 142 completely surrounds the strip feeding, exposing and severing mechanism. This cabinet is apertured at 143 to enable the object to be photographed and is provided with a conical apron 144 about the aperture to prevent access of light to the inside of the cabinet. A stool or other seat 145 is provided for the person being photographed and is readily understood, the coin slot should be located so as to be accessible to the person sitting on the seat 145.

After the complete set of exposures has been made, and the strip severed from the unexposed portion thereof, the operation of the photographing apparatus is arrested. The severed strip has at this time been fed into the feed rollers 31 and 32 of the developing apparatus. This apparatus continues to operate independently of the foregoing apparatus and completes the developing and finishing of the strip.

It will be noted that we have provided an apparatus which operates automatically upon the insertion of a coin therein, to energize a light source, feed a strip of sensitized material into position to be exposed, bring the material to rest momentarily in such position and during this period of rest to operate the shutter mechanism to make an exposure, and after a predetermined number of repetition of this series of actions to discontinue the operation of the shutter and the feeding of the sensitized material to exposure position, but operating to sever the exposed strip from the unexposed portion thereof and to feed the same through the developing and finishing solutions. It should be further noted that the optical system is arranged so as to produce an obverse or proper right and left hand arrangement of the image with relation to the object being photographed without the employment of a negative. While the exposed strip is being passed through the developing and finishing apparatus, the photographing portion of the apparatus may be again set into operation by the insertion of another coin so that there is no delay incident to the developing of the strip of picture.

While we have described and illustrated but a single embodiment of our invention it is to be understood that many changes and modifications may be made in the invention without departing therefrom and we do not desire to be limited to the exact details of construction shown and described.

What is claimed is:

1. Photographing apparatus comprising a magazine adapted to contain a reel of sensitized material, feed rollers in continuous engagement with said sensitized material, means comprising a Geneva drive for intermittently rotating said feed rollers to withdraw said sensitized material from said magazine and intermittently advance an unexposed portion thereof before an optical system, a shutter for the optical system, means actuated by said Geneva drive for intermittently operating said shutter while said feed rollers are stationary, a paper severing device, operating after a predetermined number of exposures have been made and a second Geneva drive operated from said first Geneva drive shaft for actuating said paper-severing device.

2. Automatic photographing apparatus comprising a magazine adapted to contain a supply of sensitized material, feed rollers in continuous engagement with said sensitized material, means for intermittently operating said feed rollers to withdraw said sensitized material from said magazine and advance it before an optical projection system, a continuously operable electric motor for driving said feed rollers, means for effecting an intermittent driving connection between said motor and said feed rollers and a timing device controlled by said first means for mechanically disengaging said motor from said feed roller operating means.

3. In an automatic photographing apparatus having a lens system, a shutter therefor and a supply of sensitized material, the combination of a driving member, a Geneva drive operatively connected thereto, means actuated by said Geneva drive for alternately feeding a portion of said sensitized material into position to be exposed, and for operating said shutter, a second Geneva drive operatively connected to said driving member and means actuated thereby, after a predetermined number of exposures for severing the exposed portion of said sensitized material from the unexposed portion thereof.

4. In an automatic photographing apparatus having a lens system, a shutter therefor, and a supply of sensitized material, the combination of a motor, a member adapted to be driven thereby, a clutch intermediate said motor and said member, switch controlled mechanism for causing engagement of said clutch for driving said member and means automatically operated by said member for alternately feeding a strip of said sensitized material before the lens system, and operating said shutter to expose the strip and other means actuated by said first means for severing the exposed portion of said strip from the unexposed portion after a predetermined number of exposures have been made.

5. In an automatic photographing apparatus having a lens system and a supply of sensitized material, the combination of a continuously operating motor, a shaft driven thereby, a clutch interposed between said motor and shaft, and means operated by said shaft upon engagement of said clutch for intermittently feeding a strip of said sensitized material in a position to be exposed, exposing the same and after a predetermined number of exposures severing said exposed strip from the unexposed portion thereof and a timing device for thereafter causing disengagement of said clutch.

6. In an automatic photographing apparatus the combination of an electric motor, a clutch for driving said apparatus from said motor, an electromagnetic device for effecting engagement of said clutch, mechanism for momentarily closing the circuit to said electromagnetic device to effect such engagement, and a timing member brought into operation upon engagement of said clutch for maintaining said electromagnetic device energized for a predetermined number of exposures and thereafter causing said electromagnetic device to be de-energized to discontinue the operation of the apparatus.

7. In an automatic photographing apparatus adapted to contain a supply of sensitized material, the combination of an electric motor normally disconnected from said apparatus, electrical means for producing a driving connection between said apparatus and said motor, switch for momentarily energizing said electrical means and a contact member brought into operation upon energizing of said electrical means for maintaining the same energized, and means operated by said motor for alternately feeding and exposing a strip of said sensitized material, said contact member being positively operated by said motor to de-energize said electrical means and disconnect the apparatus from said motor after a predetermined number of exposures have been made.

In testimony whereof, we have hereunto subscribed our names this 4 day of August, 1927.

CASIMIR BODAN.
STANLEY J. PASK.